United States Patent [19]

Sawaki et al.

[11] Patent Number: 4,822,434

[45] Date of Patent: Apr. 18, 1989

[54] METHOD FOR FORMING COVER LAYER OVER WIRE JOINT

[75] Inventors: Atsushi Sawaki; Mamoru Ono; Toshio Okazaki; Koji Naruse, all of Aichi, Japan

[73] Assignee: Yazaki Corporation, Tokyo, Japan

[21] Appl. No.: 126,391

[22] Filed: Nov. 30, 1987

[51] Int. Cl.$^4$ .................. H01B 13/06; H01B 13/08
[52] U.S. Cl. ........................ 156/48; 156/49; 156/55; 156/56; 156/275.5; 264/22; 264/272.14
[58] Field of Search ............. 156/48, 49, 55, 56, 156/158, 275.5, 275.7; 264/22, 272.14, 337; 523/173

[56] References Cited

U.S. PATENT DOCUMENTS

| | | | |
|---|---|---|---|
| 3,226,463 | 12/1965 | Wallace | 264/272.14 |
| 3,607,507 | 9/1971 | Enos | 156/158 |
| 4,358,331 | 11/1982 | Schmidt et al. | 156/275.5 |
| 4,606,870 | 8/1986 | McGregor | 264/22 |
| 4,664,732 | 5/1987 | Campbell et al. | 156/158 |

FOREIGN PATENT DOCUMENTS 860364  2/1961  United Kingdom .

Primary Examiner—Robert A. Dawson
Attorney, Agent, or Firm—Sughrue, Mion, Zinn, Macpeak, and Seas

[57] ABSTRACT

The invention provides an improved method for forming a cover layer over a joint of electrical wires. Portions of insulation layers of wires to be joined are stripped and the bared conductors of the wires assembled in a desired configuration to form a joint. The joint is placed in a transparent mold and the mold is filled with a photosetting resin. Radiation of an appropriate wavelength is then passed through the mold to harden the resin.

6 Claims, 2 Drawing Sheets

METHOD FOR FORMING COVER LAYER OVER WIRE JOINT

BACKGROUND OF THE INVENTION

The present invention relates to a method for protectively fixing a joint of electrical wires, and more particularly to a method for forming a cover layer over a joint of electrical wires.

Conventionally, wires having a layer of insulation made of a material such as vinyl resin have been joined by the following process. First, the insulation is stripped back by a predetermined length and the wires assembled to thereby expose the conductor. The conductors from the wires to be joined are then twisted together or arranged side by side. A conductive sleeve is next fitted over the conductors under pressure, or the conductors are soldered together, to form a joint. The joint thus formed is covered with an insulating tape or the like for insulation and protection.

The above-described conventional technique, however, is disadvantageous in that it is often difficult to adequately electrically insulate the joint, the insulating effect provided by the tape is not uniform, and the tape has only a low mechanical strength.

To overcome these drawbacks, it has been proposed to form an insulating layer over a wire joint by resin molding. In such a method, the joint is set together with insulating sheaths in a metal mold and, for instance, vinyl chloride resin is injected into the mold to thereby seal the joint with an insulating resin layer. The insulating sheaths are covered tightly with the insulating resin layer.

However, the proposed method is still disadvantageous in that, even if the insulating sheath and the insulating resin layer are made of the same material, for example, soft vinyl chloride resin, they often are not fused together in the mold due, for instance, to temperature differences. Hence, because the insulating sheath and the insulating resin layer do not completely adhere to one another, moisture can seep into the connection area of the electrical wires. Also, this conventional method is disadvantageous in that the number of process steps is large and the molding operation rather difficult to perform. Moreover, the method often results in the production of an insulating resin layer which was not uniform in thickness.

To eliminate the adhesion problem, it has been proposed to apply an adhesive to the surfaces of the insulating sheaths before the joint of the wires is set in the mold to thus improve the adhesion between the insulating sheath and the insulating resin layer. While the adhesion may be improved, extra steps are of course required. Also, the other problems mentioned above remain.

SUMMARY OF THE INVENTION

Accordingly, it is an object of the invention to provide an improved method for forming a cover layer over a joint between electrical wires in which the above-discussed drawbacks have been eliminated.

It is a further object of the invention to provide such a method with which the connecting portion between the electrical wires being joined can be formed with ease and which is rigid and uniform.

In accordance with these and other objects, the invention provides a method for forming a cover layer over a joint of electrical wires in which a photosetting resin is employed to form the cover layer. The mold used for forming the cover layer from the photosetting resin is made of a transparent material.

More specifically, in accordance with the invention, the foregoing objects have been achieved by a method for forming a cover layer over a joint of electrical wires in which, according to the invention, electrical wires are combined to form a joint with or without branches, the joint together with the adjacent insulation layers on the wires are set in a transparent mold, the mold is filled with a photosetting resin, and light is applied to the mold to polymerize and harden the resin.

DESCRIPTION OF THE PREFERRED EMBODIMENTS

Figure 1:
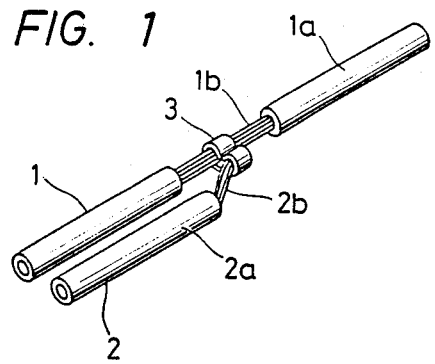
FIG. 1 is a perspective view of an example of a joint of electrical wires to which a method of forming a cover layer according to the invention is applied.

As discussed above in the Summary of the Invention, the present invention provides a method for forming a cover layer over a joint of electrical wires in which, according to the invention, electrical wires are combined to form a joint with or without branches, the joint together with the adjacent insulation layers on the wires are set in a transparent mold, the mold is filled with a photosetting resin, and light is applied to the mold to polymerize and harden the resin.

In this inventive method, the photosetting resin may be a conventional resin which includes, for instance, a vinylor acrylic-base monomer and an ultraviolet ray-sensitive polymerization initiator, and, if necessary, a monomersoluble polymer, filler and a plasticizer. An example of a suitable photosetting resin is "HARDIC" (tradename) resin produced by Dainippon Ink and Chemical, Inc., or "ARONIX UV-3333" (tradename) resin manufactured by Toagosei Chemical Industry Co., Ltd. However, the invention is of course not limited to these specific materials. That is, any photosetting resin having suitable physical characteristics for forming a insulating cover layer for a joint of electrical wires, for instance, good adhesion to the insulation layers of the wires and high mechanical strength, may be used.

The resin-molding transparent mold used in the practice of the present invention should be made of a transparent material such as glass, acrylic resin or silicone resin, which materials are not corroded by the photosetting resin when contacted thereby and which efficiently transmit light of wavelengths effective in hardening the photosetting resin. If the mold is intended for repeated operations, the inner surface of the mold should be constructed so that it does not adhere to the photosetting resin and the hardened resin can easily be removed from the mold. For this purpose, it may be desired to apply a release-enhancing material to the inner surface of the mold.

The photosetting resin is hardened at room temperature and under atmospheric pressure. Therefore, it is not always necessary that the mold have a high mechanical strength That is, in accordance with another embodiment of the invention, the mold is made of a thin sheet, and, after the resin has been hardened, the mold is merely left in place, becoming part of the protective cover. In this case, it is of course preferable for the mold to be made of a material which adheres to the photosetting resin.

The mold may, for example, be composed of two parts (top and bottom parts) so that the joint of electrical wires together with the insulation layers of the wires can be easily placed within the mold. It is preferable for one of the two parts to have a resin injection port and a vent port. It is of course understood that when the joint of electrical wires is set in the mold and the mold closed the surfaces of the insulation layers of the wires should be in close contact with the mold so that photosetting resin can be made to ooze into the small gap between the top and bottom parts of the mold around the wires.

The photosetting resin in the mold can be hardened by means of a light source which emits light of wavelengths effective in hardening the resin, such as ultraviolet rays, with a sufficiently high intensity. Of course, the invention is not limited just to the use of ultraviolet rays; that is, any type of radiation which will trigger the hardening reaction in the resin may be used.

More specifically, the cover layer formed around the joint of electrical wires can be formed, in accordance with the invention, as follows. First, the joint is set in the mold, and then photosetting resin is injected into the mold. The mold is then placed in a hardening chamber where a suitable number of light sources such as ultraviolet lamps are installed, and then exposed to light from these sources for a period of time required to harden the resin. After the resin has hardened, the wires covered with the resin are removed from the mold. A coupling part is thereby formed having the requisite properties, specifically, a covering part which adheres to the insulation layers of the wires.

Because the cover layers adheres tightly to the insulation layers of the electrical wires, moisture is prevented from entering the coupling part. Thus, excellent stability of the coupling part is obtained.

The invention will now be further described with reference to specific examples.

EXAMPLE 1

A first specific example of a method of the invention for forming a cover layer over a joint of electrical wires will be described with reference to FIGS. 1 through 4.

As illustrated in FIG. 1, about 15 mm of an insulation layer $1a$ made of a vinyl-chloride compound was stripped from a middle portion of a first wire 1 to expose the conductor $1b$. Further, about 10 mm of an insulation layer $2a$ of a similar, second electrical wire 2 was stripped from second wire to expose its conductor $2b$. The conductors $1b$ and $2b$ were placed side by side, and a conductive sleeve 3 was fitted on the conductors $1b$ and $2b$ arranged in such a manner that the second wire 2 branched off from the first wire 1.

Figure 2A:
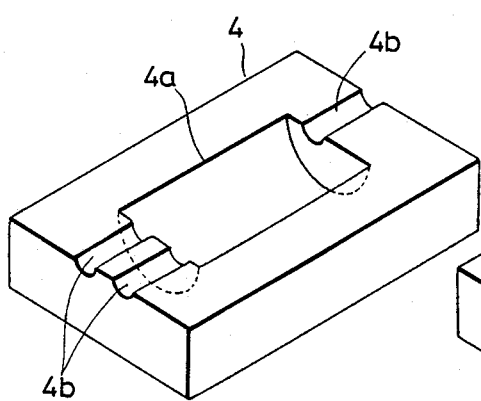
FIG. 2 is a perspective view of an example of a mold used in the method of the invention.
Figure 2B:
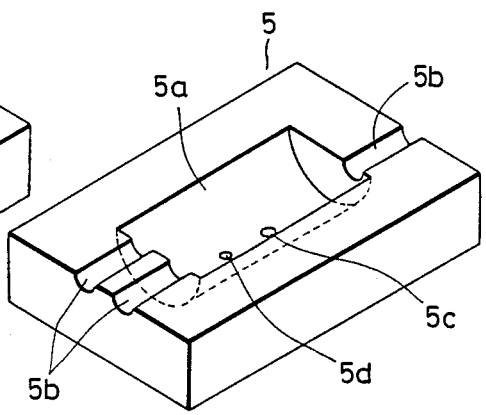

As shown in FIGS. 2A and 2B, a top part 5 and a bottom part 4 of a mold have respective cover layer-forming chambers $5a$ and $4a$ for accommodating the joint of the electric wires 1 and 2, and branch accommodating grooves $5b$ and $4b$ for tightly clamping the insulation layers of the two wires. The cover layer-forming chamber $5a$ of the top part 5 has a resin injecting port $5c$ and a vent port $5d$ which communicate with the outside.

Figure 3:
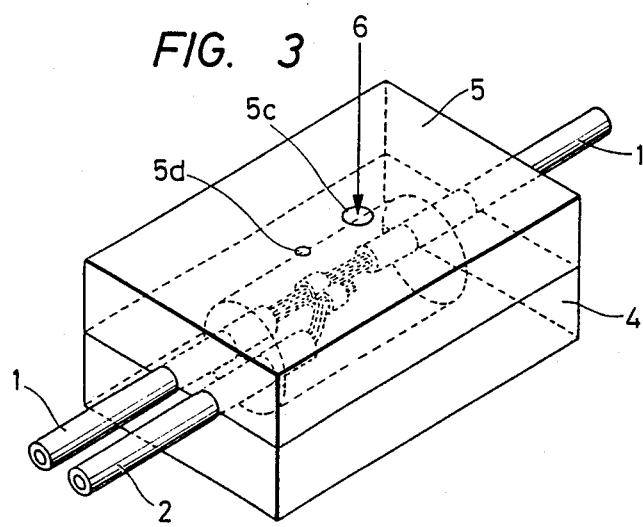
FIG. 3 is a perspective view showing a joint of electrical wires set in the mold of FIG. 2.

With reference to FIG. 3, after the joint of the electric wires 1 and 2 was set in the bottom part 4, the latter was covered with the top part 5. In this state, a photosetting resin compound 6 was injected into the mold. In this example, the above-mentioned "HARDIC" resin was used.

The mold assembled from the top and bottom parts 5 and 4 containing the injected photosetting resin was irradiated for about 10 to 15 secons with an ultraviolet lamp having a power of 2 kW and which was installed above the mold to thus harden the resin. The wires and hardened resin were subsequently removed from the mold.

Figure 4:
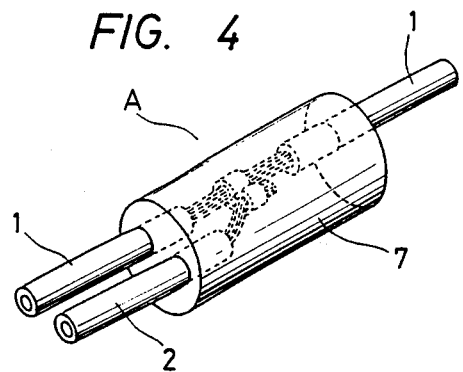
FIG. 4 is a perspective view showing the external appearance of a connecting part formed on the joint of electrical wires by the method of the invention.

As a result of this process, as seen in FIG. 4, a cover layer 7 was formed over the joint of the electrical wires 1 and 2; that is, a connecting part A having the cover layer 7 was obtained. The cover layer 7 had a very uniform density of material and adhered well to the insulation layers of the wires

EXAMPLE 2

Figure 5:
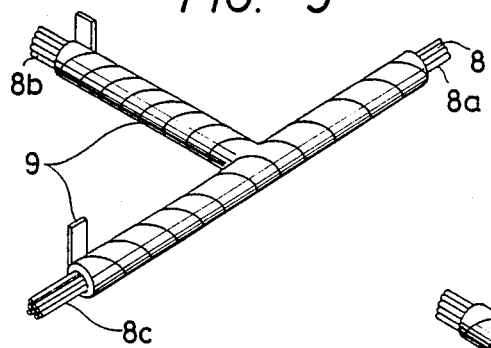
FIG. 5 is a perspective view showing another example of a joint of electrical wires to which the method of the invention can be applied.
Figure 6:
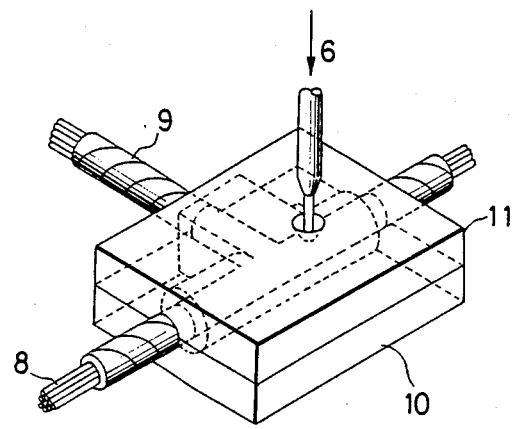
FIG. 6 is a perspective view showing the joint of FIG. 5 set in another mold prior to injection of resin.

A second example of the method of the invention will be described with reference to FIGS. 5, 6 and 7.

In this second example, some of the electrical wires 8 were connected in such a manner as to branch in three directions in substantially the same manner as in Example 1. That is, some of the wires were bent in such a manner as to form branches $8a$ and $8b$, while the remaining ones of the wires 8 were similarly bent to form part of the branch $8b$ and another branch $8c$. An insulating electrical tape was wound around the branched joint of the electrical wires as shown in FIG. 5.

The joint thus prepared was set between the top and bottom parts 11 and 10, respectively, of a mold having a different configuration from that of Example 1 but which functions in the same manner. The photosetting resin was injected into the mold as shown in FIG. 6. In a manner similar to that employed in Example 1, ultraviolet rays were applied to the mold to harden the resin After hardening, the resin was removed from the mold.

Figure 7:
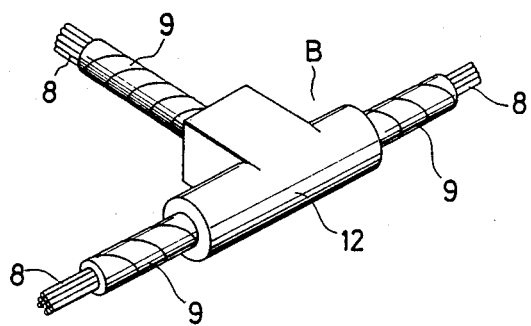
FIG. 7 is a perspective view showing the external appearance of a connecting part formed on the electrical wires with the mold shown in FIG. 6.

As a result of this process, a connecting part B was formed having a cover layer 12 as shown in FIG. 7. The connecting part B was rigid and could not be readily deformed when an external load was applied. The various wires could not be displaced within their respective bundles In the method of the invention as described above, the joints of the electrical wires to be connected together are set in a resin-molding transparent mold. It can thus be easily confirmed whether or not the wires are in their correct positions before the resin is injected. Accordingly, the inventive method is free from the difficulty of the cover layer being formed in a nonuniform manner. Furthermore, in the inventive method a photosetting resin having a low viscosity can be employed. Because of this, good adhesion is obtained between the hardened resin and the insulation layers of the wires, and hence an excellent sealing effect against the entrance of moisture into the connecting part is obtained and the connecting part has a high mechanical strength Moreover, because the resin is hardened at room temperature and under atmospheric pressure, the mold can be made light in weight and small in size, thereby allowing the molding work to be carried out with a higher efficiency.

What is claimed is:

1. A method for forming a cover layer over a joint of electrical wires, comprising the steps of:
   assembling a plurality of electrical wires to form a joint;
   placing said joint in a transparent mold;
   filling said mold with a photosetting resin;
   applying radiation through said mold to harden said resin; and
   removing said mold after said resin is hardened.

2. The method for forming a cover layer of claim 1, wherin said mold has top and bottom parts, and said step of filling said mold comprises injecting liquid resin material through a resin injecting port in said top part.

3. The method for forming a cover layer of claim 1, wherein said photsetting resin is of a type which adheres to insulation layers of said wires when hardened.

4. The method for forming a cover layer of claim 1, further comprising an initial step of stripping portions of insulation layers from said wires, and wherein, in said step of placing said joint in said mold, remaining portions of said insulation layers are positioned at edge portions of said mold so that said resin adhere to said remaining portions.

5. A method for forming a cover layer over a joint of electrical wires, comprising the steps of:
   assembling a plurality of electrical wires to form a joint;
   wrapping said joint with an insulating electrical tape;
   placing said joint in a transparent mold;
   filling said mold with a photosetting resin; and
   applying radiation through said mold to harden said resin.

6. The method for forming a cover layer of claim 5, wherein said mold is formed from a thin transparent sheet and is left as a part of said cover layer.

* * * * *